Patented Oct. 4, 1932

1,880,421

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

PROCESS OF MAKING DISULPHIDES OF MERCAPTOTHIAZOLES

No Drawing.    Application filed November 19, 1930. Serial No. 496,820.

My invention relates to methods of synthesizing organic compounds and it has particular relation to the synthesis of disulphides of mercaptans.

One object of the invention is to provide a simple and efficient process of effecting the oxidation of such mercaptans as mercaptobenzothiazole and similar thiazole compounds whereby to form di-sulphide compounds. Other objects and advantages will be apparent as the description of the invention proceeds.

In the rubber industry, certain thiazole compounds, notably mercaptobenzothiazole and the di-sulphide of this compound obtained by the oxidation of the mercaptan group of the thiazole, are employed as accelerators of vulcanization. For purposes of effecting a combination of the mercaptan groups in thiazoles and the resultant formation of the di-sulphides, it has heretofore been proposed to subject the mercaptothiazole compounds to the action of oxidizing agents, such as potassium di-chromate or chlorine gas. These methods were objectionable for commercial purposes because it was essential that the mercaptothiazole compounds be available in a dissolved form before they could be caused to react with the oxidizing agent. The solvents employed were relatively expensive to obtain and furthermore, considerable labor and expense was involved in removing them from the resultant di-sulphide of the mercaptans.

This invention consists in the discovery that di-sulphides of mercaptobenzothiazole and similar mercaptans may readily be prepared without first dissolving the mercaptan, merely by treating the mercaptans with relatively dilute nitric acid. Where it is desired to manufacture the disulphide of mercaptobenzothiazole (benzo thiazyl di-sulphide) the thiazole, which is normally a crystalline material, but obtained commercially as a relatively fine powder, is intermixed with water to form a suspenson consisting essentially of the powder suspension in the liquid. Of course, a small amount of the thiazole is dissolved in the water. However, this amount is relatively slight.

The ratio of mercaptobenzothiazole in water may vary within relatively wide limits. However, satisfactory results may be obtained by intermixing 2000 parts of the thiazole with 10,000 to 20,000 parts of water. This suspension should be heated to the boiling point, after which 720 parts of concentrated nitric acid having a specific gravity of 1.41 are added. This addition should be made quite slowly in order to prevent the formation of an excessive amount of foam. Also, the suspension should be agitated vigorously, both throughout the period of preliminary heating and the period required for the addition of the acid in order to prevent any settling of the finely divided solid material. The reaction resulting may be represented by the following equation.

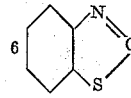 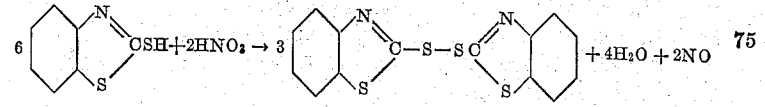

The reaction product consisting essentially of benzothiazyl disulphide may be separated from the water in which it is suspended by filtration and is obtained in practically quantitative yields. If desired, the above described reaction may be conducted in the presence of solvents for the mercaptan, such as acetic acid or similar materials. However, the use of such solvents increases the expense of the process and generally is unnecessary.

In conducting the reaction, it is essential that the concentration of the nitric acid be maintained at a relatively low value in order to prevent the introduction of nitro groups into the benzene nucleus. This value, of course, may be determined by experiment. In general the concentration should not rise above 40 per cent. If a purer form of benzothiazyl disulphide than is obtainable by filtration of the crude reaction product from the suspending medium is desired, the above described reaction product, as obtained by filtration and washing, may be dissolved in hot xylene and permitted to crystallize therefrom. However, for most commercial purposes, this re-crystallization is quite unnecessary. The melting point of the pure material ranges from 179° to 180° C. The melting point of the crude material varies from 163° to 167° C.

The same method may be employed in the manufacture of disulphides from nucleus substituted thiazoles such as 1-mercapto tolyl thiazole, 1-mercapto xylyl thiazole, 1-mercapto chlor benzothiazole, 1-mercapto nitro benzothiazole (either mono or dinitro 1-mercapto benzothiazole) 1-mercapto naphtho thiazole as well as other thiazoles of like nature.

Likewise, the method is applicable to the manufacture of disulphides of such mercaptans, as benzyl mercaptan ortho amino thio phenol, butyl mercaptan, etc.

It is thus apparent that the method constituting the subject matter of the invention is relatively simple in character and does not require the use of expensive solvents other than ordinary water. The yields obtained by the use of the invention are excellent and the steps involved in conducting the reaction are quite simple in character and do not require any particular care.

Although I have described the preferred form of the invention in detail, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of manufacturing benzenoid thiazyl disulphides which comprises subjecting a mercaptothiazole to the action of dilute nitric acid.

2. A method of manufacturing mercapto aryl thiazole disulphides which comprises subjecting mercapto aryl thiazoles to the action of dulate nitric acid.

3. A method of manufacturing mercaptobenzothiazole disulphides which comprises subjecting the desired mercaptobenzothiazole to the action of dilute nitric acid.

4. A method of manufacturing thiazyl disulphides which comprises subjecting a mercapto benzenoid thiazole to the action of dilute nitric acid.

5. A method of manufacturing thiazyl disulphides which comprises subjecting the corresponding thiazyl sulphide to the action of dilute nitric acid.

6. The method of converting an aryl mercaptan to the corresponding disulphide which comprises subjecting the aryl mercaptan to the action of nitric acid of concentration less than approximately 40 percent.

7. The method of converting a thiazyl mercaptan to the corresponding disulphide which comprises subjecting the thiazyl mercaptan to the action of nitric acid of concentration less than approximately 40 percent.

8. A method of manufacturing organic disulphides which comprises treating with dilute nitric acid a material selected from a group consisting of the alkyl mercaptans, benzyl mercaptans, thiophenols and thiazyl sulphides.

9. The method of manufacturing organic disulphides which comprises treating with dilute nitric acid a material selected from a group consisting of the thiophenols, benzyl mercaptans and thiazyl sulphides.

In witness whereof, I have hereunto signed my name at Akron, in the county of Summit and State of Ohio, U. S. A., this 18th day of November, 1930.

ALBERT M. CLIFFORD.

CERTIFICATE OF CORRECTION.

Patent No. 1,880,421.  October 4, 1932.

ALBERT M. CLIFFORD.

It is hereby certified that error appears in the printed specification of the above numbered patent requiring correction as follows: Page 2, line 21, after "mercaptan" insert a comma; and line 51, claim 2, for "dulate" read "dilute"; and that the said Letters Patent should be read with these corrections therein that the same may conform to the record of the case in the Patent Office.

Signed and sealed this 16th day of May, A. D. 1933.

M. J. Moore.

Acting Commissioner of Patents.

(Seal)